US011254242B2

(12) United States Patent
Masu et al.

(10) Patent No.: US 11,254,242 B2
(45) Date of Patent: Feb. 22, 2022

(54) OCCUPANT POSTURE ADJUSTMENT DEVICE AND PEDAL DEVICE

(71) Applicant: HONDA MOTOR CO., LTD., Tokyo (JP)

(72) Inventors: Shintaro Masu, Wako (JP); Hisashi Murayama, Wako (JP); Yuki Aoki, Wako (JP); Ryoji Iida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 16/793,685

(22) Filed: Feb. 18, 2020

(65) Prior Publication Data

US 2020/0262321 A1   Aug. 20, 2020

(30) Foreign Application Priority Data

Feb. 20, 2019   (JP) .............................. JP2019-027943

(51) Int. Cl.
| | |
|---|---|
| *B60N 3/06* | (2006.01) |
| *B60N 2/20* | (2006.01) |
| *G05D 1/00* | (2006.01) |
| *B60T 7/06* | (2006.01) |
| *B60K 26/02* | (2006.01) |
| *F02D 11/02* | (2006.01) |

(52) U.S. Cl.
CPC ................ *B60N 2/20* (2013.01); *B60K 26/02* (2013.01); *B60T 7/06* (2013.01); *F02D 11/02* (2013.01); *G05D 1/0088* (2013.01); *B60K 2026/026* (2013.01)

(58) Field of Classification Search
CPC ...... B60R 21/09; B60R 25/006; B60R 25/005
See application file for complete search history.

(56) References Cited

U.S. PATENT DOCUMENTS

| | | | |
|---|---|---|---|
| 6,349,965 B1 * | 2/2002 | Heilig ..................... | B60R 21/02 280/748 |
| 6,450,530 B1 * | 9/2002 | Frasher .................. | B60N 2/002 280/735 |

(Continued)

FOREIGN PATENT DOCUMENTS

| | | | |
|---|---|---|---|
| EP | 1488963 A1 * | 12/2004 | ............. B60T 7/065 |
| JP | 2005-271770 A | 10/2005 | |

(Continued)

OTHER PUBLICATIONS

Machine Translation of WO 2019-016131, obtained Jul. 9, 2021.*

(Continued)

*Primary Examiner* — Richard W Ridley
*Assistant Examiner* — Brian J McGovern
(74) *Attorney, Agent, or Firm* — Carrier Blackman & Associates, P.c.; Joseph P. Carrier; Jeffrey T. Gedeon

(57) ABSTRACT

An occupant posture adjustment device and a pedal device include a pedal adjustment mechanism that changes the inclination of a pedal with respect to a floor panel between a first driving state and a second driving state, and a controller that, in the first driving state, controls the pedal adjustment mechanism such that a back face of the pedal and the floor panel are separated from each other, and in the second driving state, controls the pedal adjustment mechanism such that the back face of the pedal and the floor panel come into contact with each other.

9 Claims, 5 Drawing Sheets

(56) References Cited

U.S. PATENT DOCUMENTS

| | | | | |
|---|---|---|---|---|
| 6,614,344 | B1* | 9/2003 | Frasher | B60N 2/0252 340/425.5 |
| 7,673,538 | B2* | 3/2010 | Choi | G05G 1/405 74/512 |
| 10,889,226 | B1* | 1/2021 | Dean | G05G 5/28 |
| 10,906,514 | B1* | 2/2021 | Kim | G05G 1/40 |
| 10,946,741 | B1* | 3/2021 | Kim | B60T 7/06 |
| 10,994,611 | B1* | 5/2021 | Kim | B60K 26/02 |
| 11,021,058 | B1* | 6/2021 | Kim | G05G 5/28 |
| 2005/0109555 | A1* | 5/2005 | Ohtsubo | B60R 16/037 180/326 |
| 2006/0087154 | A1* | 4/2006 | Schlafer | B60N 3/063 296/190.01 |
| 2007/0176456 | A1* | 8/2007 | Ohtsubo | B60N 2/074 296/75 |
| 2007/0205626 | A1* | 9/2007 | Ohtsubo | B60N 2/1695 296/75 |
| 2008/0231090 | A1* | 9/2008 | Takeda | B60N 3/063 297/83 |
| 2016/0082867 | A1* | 3/2016 | Sugioka | B60N 2/06 701/49 |
| 2016/0264022 | A1* | 9/2016 | Mizutani | B60N 2/16 |
| 2017/0021838 | A1* | 1/2017 | Fontana | B60W 50/08 |
| 2017/0217335 | A1* | 8/2017 | Tominaga | B60N 2/0248 |
| 2017/0334313 | A1* | 11/2017 | Ahn | B60N 2/3011 |
| 2018/0186266 | A1* | 7/2018 | Fitzpatrick | B60N 2/14 |
| 2018/0244174 | A1* | 8/2018 | Tan | B60N 2/22 |
| 2019/0255972 | A1* | 8/2019 | Breitweg | B60N 2/0248 |
| 2020/0139853 | A1* | 5/2020 | Nawrocki | B60N 2/20 |
| 2020/0257329 | A1* | 8/2020 | Kihara | B60K 26/02 |
| 2020/0262321 | A1* | 8/2020 | Masu | B60N 2/20 |
| 2020/0317152 | A1* | 10/2020 | Ghaffari | G05D 1/0061 |
| 2020/0317166 | A1* | 10/2020 | Ghaffari | B60K 26/02 |
| 2020/0317167 | A1* | 10/2020 | Ghaffari | B60T 7/06 |
| 2020/0398725 | A1* | 12/2020 | Mullen | B60T 7/06 |
| 2021/0109560 | A1* | 4/2021 | Ford | B60K 26/02 |
| 2021/0170988 | A1* | 6/2021 | Villalva Sanchez | B60T 7/06 |

FOREIGN PATENT DOCUMENTS

| | | | | |
|---|---|---|---|---|
| JP | 2017-094855 A | | 6/2017 | |
| JP | 2018-075920 A | | 5/2018 | |
| KR | 2017-0000013 | * | 1/2017 | B60K 26/02 |
| KR | 2017-0137427 | * | 12/2017 | B60K 26/02 |
| WO | WO-2019007840 A1 | * | 1/2019 | B60N 3/066 |
| WO | WO-2019016131 A1 | * | 1/2019 | B60N 3/063 |

OTHER PUBLICATIONS

Machine Translation of WO 2019-007840, obtained Jul. 9, 2021.*
Machine Translation of KR 2017-0000013, obtained Jul. 9, 2021.*
Machine Translation of KR 2017-0137427, obtained Jul. 9, 2021.*

* cited by examiner

OCCUPANT POSTURE ADJUSTMENT DEVICE AND PEDAL DEVICE

CROSS-REFERENCE TO RELATED APPLICATION

This application is based upon and claims the benefit of priority from Japanese Patent Application No. 2019-027943 filed on Feb. 20, 2019, the contents of which are incorporated herein by reference.

BACKGROUND OF THE INVENTION

Field of the Invention

The present invention relates to a pedal device and an occupant posture adjustment device which are installed on a vehicle that performs driving control in response to pedal operations.

Description of the Related Art

Japanese Laid-Open Patent Publication No. 2005-271770 discloses a driving posture adjustment device that creates proper eye points of a driver in a manual driving state and in an automated driving state regardless of the build of the driver. The device adjusts the eye point to a proper position by adjusting the height of a seat based on information about the driver's height input by the driver via a body size input unit.

SUMMARY OF THE INVENTION

Recent years have seen development of autonomous vehicles that are capable of switching between a manual driving state in which the driver performs driving and an automated driving state in which an electronic control device (such as an ECU) performs driving. When an electronic control device performs driving, burden on the driver is lessened. Thus, the driver is expected to adjust the position (height and fore-and-aft position) or the attitude (inclination) of the seat to create a comfortable riding posture during automated driving. To that end, an arrangement like the driving posture adjustment device described in Japanese Laid-Open Patent Publication No. 2005-271770 can be employed.

When an electronic control device controls at least one of acceleration and deceleration, an accelerator pedal or a brake pedal is not necessary for the driver. Further, when not in use, the accelerator pedal or brake pedal compromises the spatial efficiency and appearance of foot space in a driver's seat.

In view of such challenges, an object of the present invention is to provide an occupant posture adjustment device and a pedal device that simplify the foot space in the driver's seat and improve the spatial efficiency and appearance of the space.

A first aspect of the present invention is an occupant posture adjustment device which is installed on a vehicle configured to switch between a first driving state in which driving control is partially performed in response to an operation of a pedal and a second driving state in which driving control is partially performed without relying on the operation of the pedal, the occupant posture adjustment device including: a seat adjustment mechanism configured to change at least one of a position and an inclination of a seat between the first driving state and the second driving state; a pedal adjustment mechanism configured to change an inclination of the pedal with respect to a floor panel between the first driving state and the second driving state; and a controller configured to, in the first driving state, control the seat adjustment mechanism to set a posture of an occupant to a driving posture and control the pedal adjustment mechanism to separate a back face of the pedal and the floor panel from each other, and in the second driving state, control the seat adjustment mechanism to set the posture of the occupant to a non-driving posture and control the pedal adjustment mechanism to bring the back face of the pedal and the floor panel into contact with each other.

A second aspect of the present invention is a pedal device which is installed on a vehicle configured to switch between a first driving state in which driving control is partially performed in response to an operation of a pedal and a second driving state in which driving control is partially performed without relying on the operation of the pedal, the pedal device including: a pedal adjustment mechanism configured to change an inclination of the pedal with respect to a floor panel between the first driving state and the second driving state; and a controller configured to, in the first driving state, control the pedal adjustment mechanism to separate a back face of the pedal and the floor panel from each other, and in the second driving state, control the pedal adjustment mechanism to bring the back face of the pedal and the floor panel into contact with each other.

The present invention simplifies the foot space in the driver's seat. It also improves the spatial efficiency and appearance of the foot space in the driver's seat.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The occupant posture adjustment device and the pedal device according to the present invention are now described in detail by showing a preferred embodiment with reference to the attached drawings.

[1. Overview of Occupant Posture Adjustment Device 30]

Figure 1:
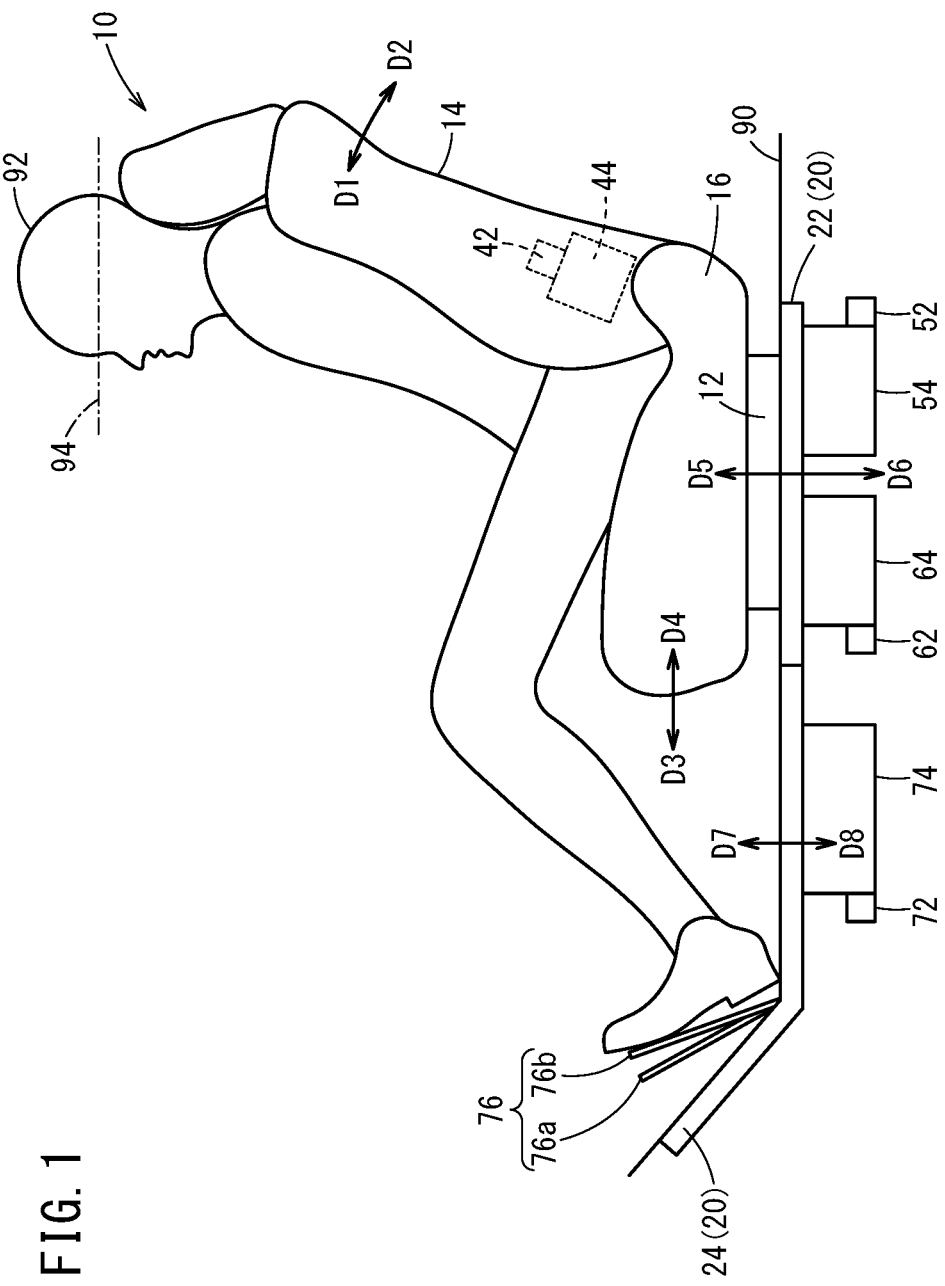
FIG. 1 schematically illustrates a driver's seat as seen from left.
Figure 2:
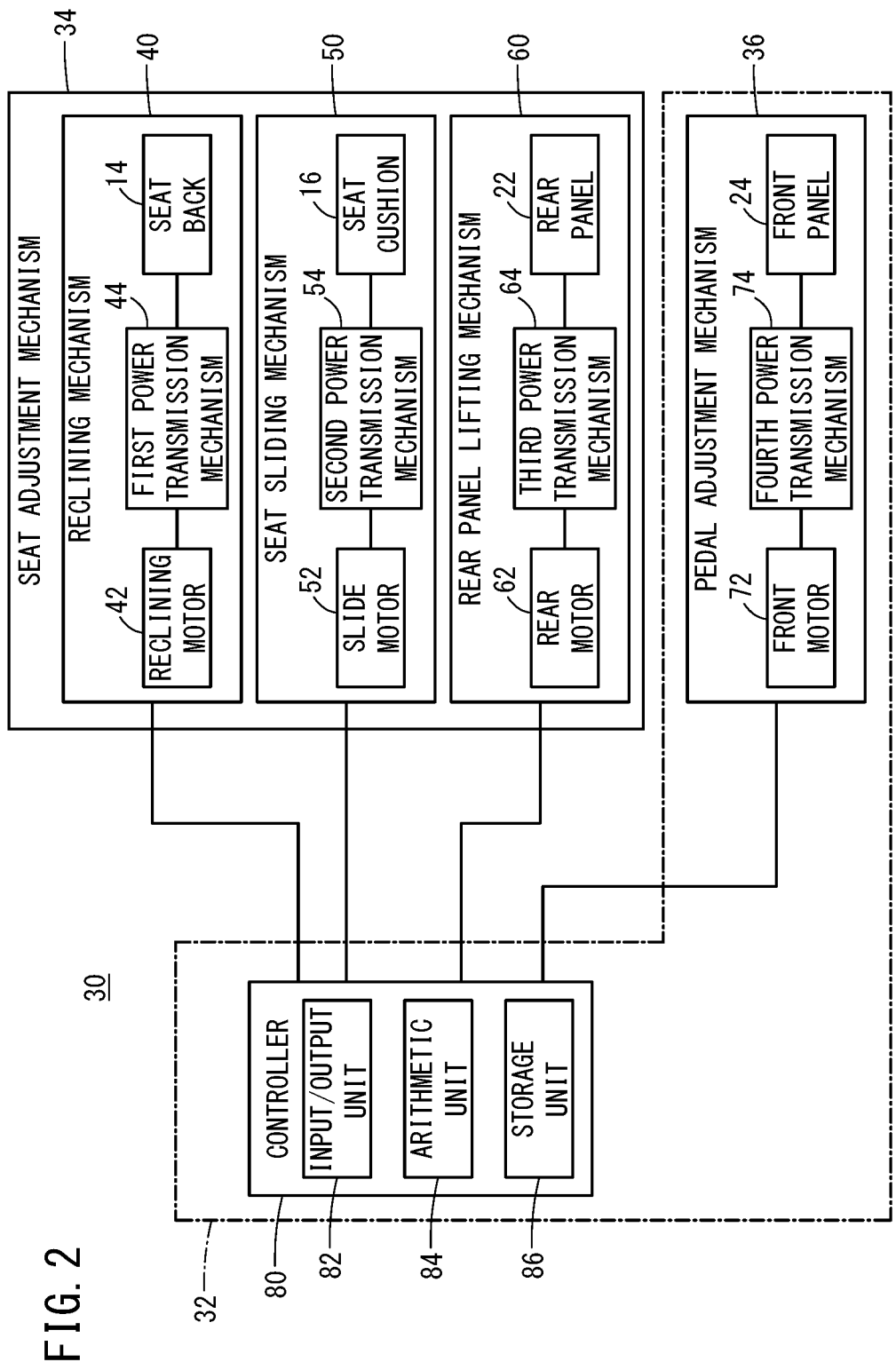
FIG. 2 shows a configuration of an occupant posture adjustment device and a pedal device according to an embodiment of the present invention.

Referring to FIGS. 1 and 2, an occupant posture adjustment device 30 is generally described. The occupant posture adjustment device 30 is installed on a vehicle that is capable of switching between a manual driving state (a first driving state) and an automated driving state (a second driving state). The vehicle may also be an autonomous vehicle (a driver assistance vehicle) capable of switching only acceleration/deceleration operations between manual and automatic. The vehicle uses an accelerate-by-wire system in which an accelerator pedal 76a and a driving force outputting mechanism are mechanically separated, and a brake-by-wire system in which a brake pedal 76b and a braking mechanism are mechanically separated.

The occupant posture adjustment device 30 changes the position of a seat 10 (its height position and fore-and-aft position), the inclination angle of the seat 10, the height position of a front panel 24, and the inclination angles of the accelerator pedal 76a and the brake pedal 76b with respect to the front panel 24 at the time of switching the driving state.

[2. Configuration of Occupant Posture Adjustment Device 30]

As shown in FIG. 1, a floor panel 20 is provided in a cabin, and the seat 10 for the driver is disposed on the floor panel 20. The seat 10 includes a seat cushion 16 affixed to a base 12, and a seat back 14 with a variable inclination angle with respect to the seat cushion 16. The floor panel 20 includes the front panel 24 provided at the driver's feet, and a rear panel 22 provided on a back side of the front panel 24 at the position of the seat 10.

As shown in FIG. 2, the occupant posture adjustment device 30 includes a seat adjustment mechanism 34, a pedal adjustment mechanism 36, and a controller 80. The seat adjustment mechanism 34 includes a reclining mechanism 40, a seat sliding mechanism 50, and a rear panel lifting mechanism 60. Herein, the pedal adjustment mechanism 36 and the controller 80 are referred to as a pedal device 32.

The reclining mechanism 40 includes a reclining motor 42, a first power transmission mechanism 44, and the seat back 14. The reclining motor 42 is an electric motor. The first power transmission mechanism 44 couples an output shaft of the reclining motor 42 with the seat back 14, and converts a rotating motion of the reclining motor 42 to an inclining motion of the seat back 14.

The seat sliding mechanism 50 includes a slide motor 52, a second power transmission mechanism 54, and the seat cushion 16. The slide motor 52 is an electric motor. The second power transmission mechanism 54 couples an output shaft of the slide motor 52 with the seat cushion 16, and converts a rotating motion of the slide motor 52 to a sliding motion of the seat cushion 16 in the fore-and-aft direction.

The rear panel lifting mechanism 60 includes rear motors 62 and third power transmission mechanisms 64, which are provided on the right and left sides, and the rear panel 22. The rear motor 62 is an electric motor. The third power transmission mechanism 64 couples an output shaft of the rear motor 62 with the rear panel 22, and converts a rotating motion of the rear motor 62 to a lifting or lowering motion of the rear panel 22. The rear panel lifting mechanism 60 is described later in [4.] in more detail. The upper surface of the rear panel 22 is located at the same height as a reference position 90 of the floor during the manual driving state.

Figure 3:
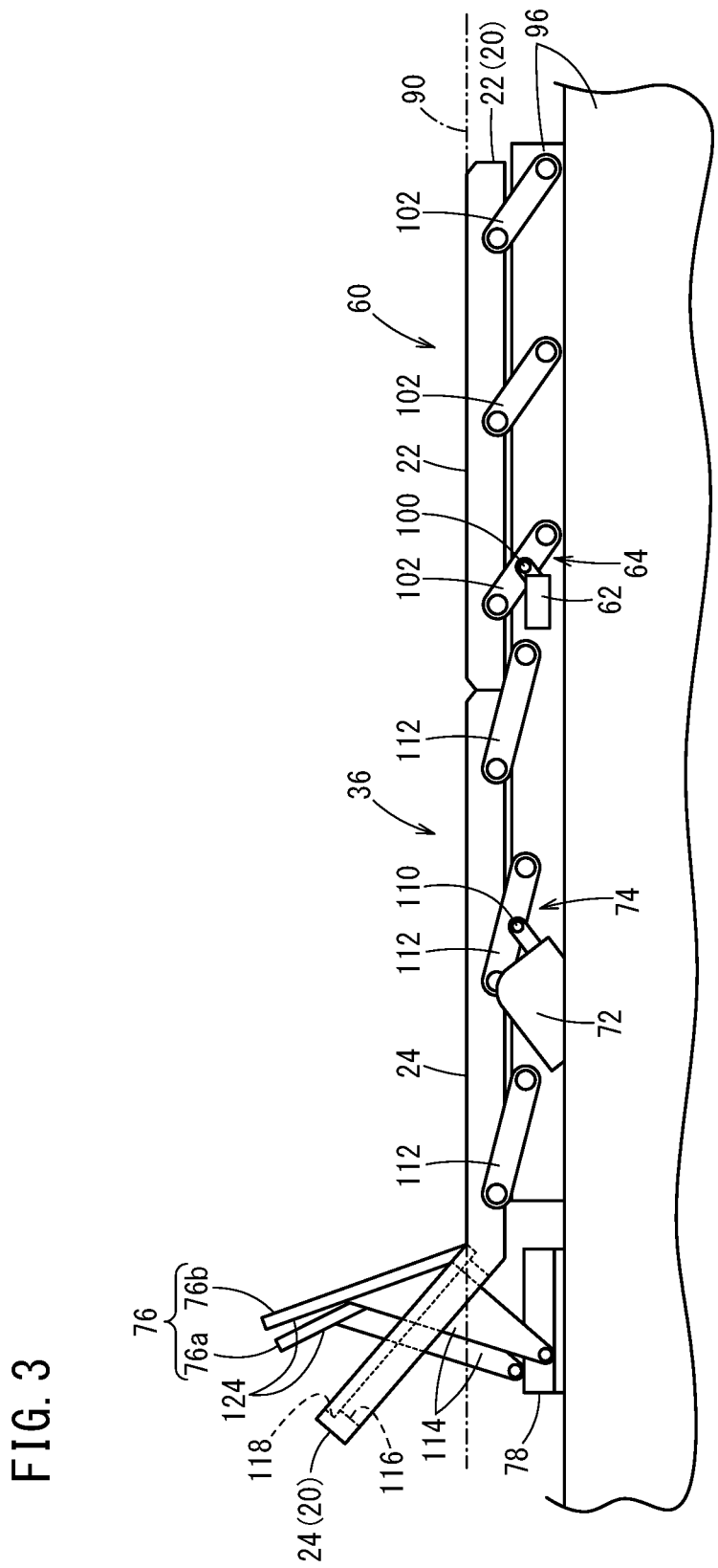
FIG. 3 shows workings of a rear panel lifting mechanism and a pedal adjustment mechanism during manual driving.

The pedal adjustment mechanism 36 includes front motors 72 and fourth power transmission mechanisms 74, which are provided on the right and left sides, the front panel 24, a pedal 76 (FIG. 3), and a pedal supporting portion 78 (FIG. 3). The front motor 72 is an electric motor. The fourth power transmission mechanism 74 couples an output shaft of the front motor 72 with the front panel 24, and converts a rotating motion of the front motor 72 to a lifting or lowering motion of the front panel 24. The pedal adjustment mechanism 36 is described later in [4.] in more detail. The upper surface of the front panel 24 is located at the same height as the reference position 90 of the floor during the manual driving state.

The controller 80 is an ECU, including an input/output unit 82, an arithmetic unit 84, and a storage unit 86. The input/output unit 82 is formed of an A/D converter circuit, a communication interface, a driver, and the like. The arithmetic unit 84 is formed of a processor having a CPU and the like, for example. The arithmetic unit 84 implements various functions by executing programs stored in the storage unit 86. The storage unit 86 is formed of RAM, ROM, and the like. The storage unit 86 stores various programs and various kinds of information for use in the processing performed by the arithmetic unit 84.

[3. Operation of Occupant Posture Adjustment Device 30]

The driving state of the vehicle is managed by an autonomous driving ECU (not shown). The autonomous driving ECU outputs an automated driving signal to the controller 80 when switching the driving state from the manual driving state to the automated driving state, and outputs a manual driving signal to the controller 80 when switching the driving state from the automated driving state to the manual driving state.

[3.1. Operations in Switching from Manual Driving State to Automated Driving State]

When an automated driving signal is input, the arithmetic unit 84 of the controller 80 actuates mechanisms (the seat adjustment mechanism 34 and the pedal adjustment mechanism 36) in order to change the posture of the occupant sitting on the seat 10 from a driving posture to a non-driving posture. Specifically, the controller 80 controls the input/output unit 82 to supply electric power to the motors in the mechanisms (the reclining motor 42, the slide motor 52, the rear motor 62, and the front motor 72).

The reclining motor 42 rotates in one direction with the supply of electric power. Power of the reclining motor 42 is transmitted to the seat back 14 via the first power transmission mechanism 44. Then, the seat back 14 tilts backward (in the D2 direction in FIG. 1).

The slide motor 52 rotates in one direction with the supply of electric power. Power of the slide motor 52 is transmitted to the seat cushion 16 via the second power transmission mechanism 54. Then, the seat cushion 16 moves frontward (in the D3 direction in FIG. 1).

The rear motor 62 rotates in one direction with the supply of electric power. Power of the rear motor 62 is transmitted to the rear panel 22 via the third power transmission mechanism 64. Then, the rear panel 22 moves upward (in the D5 direction in FIG. 1). At this point, the seat cushion 16 also moves upward.

The front motor 72 rotates in one direction with the supply of electric power. Power of the front motor 72 is transmitted to the front panel 24 via the fourth power transmission mechanism 74. Then, the front panel 24 moves upward (in the D7 direction in FIG. 1).

When changing the posture of the occupant from the driving posture to the non-driving posture, the controller 80 synchronizes the timing at which the motion of the seat 10 ends and the timing at which the motion of the floor panel 20 ends. For example, the controller 80 activates the motors (the reclining motor 42, the slide motor 52, the rear motor 62, and the front motor 72) at individual timings and then stops the motors at the same time. Alternatively, the controller 80 drives the motors at individual speeds and then stops the motors at the same time.

Ranges of movement of the seat back 14, the seat cushion 16, and the rear panel 22 are preset so that an eye point 94 of the occupant in the driving posture and the eye point 94 of the occupant in the non-driving posture are at the same height. A virtual occupant 92 is assumed herein, and the ranges of movement of the seat back 14, the seat cushion 16, and the rear panel 22 are set so that the eye point 94 of the virtual occupant 92 is kept constant.

[3.2. Operations in Switching from Automated Driving State to Manual Driving State]

When a manual driving signal is input, the arithmetic unit 84 of the controller 80 actuates mechanisms (the seat adjustment mechanism 34 and the pedal adjustment mechanism 36) in order to change the posture of the occupant sitting on the seat 10 from the non-driving posture to the driving posture. Specifically, the controller 80 controls the input/output unit 82 to supply electric power to the motors in the mechanisms (the reclining motor 42, the slide motor 52, the rear motor 62, and the front motor 72).

The reclining motor 42 rotates in the other direction with the supply of electric power. Power of the reclining motor 42 is transmitted to the seat back 14 via the first power transmission mechanism 44. Then, the seat back 14 rises forward (in the D1 direction in FIG. 1).

The slide motor 52 rotates in the other direction with the supply of electric power. Power of the slide motor 52 is transmitted to the seat cushion 16 via the second power transmission mechanism 54. Then, the seat cushion 16 moves backward (in the D4 direction in FIG. 1).

The rear motor 62 rotates in the other direction with the supply of electric power. Power of the rear motor 62 is transmitted to the rear panel 22 via the third power transmission mechanism 64. Then, the rear panel 22 moves downward (in the D6 direction in FIG. 1). At this point, the seat cushion 16 also moves downward.

The front motor 72 rotates in the other direction with the supply of electric power. Power of the front motor 72 is transmitted to the front panel 24 via the fourth power transmission mechanism 74. Then, the front panel 24 moves downward (in the D8 direction in FIG. 1).

[4. Rear Panel Lifting Mechanism 60 and Pedal Adjustment Mechanism 36]

Figure 4:
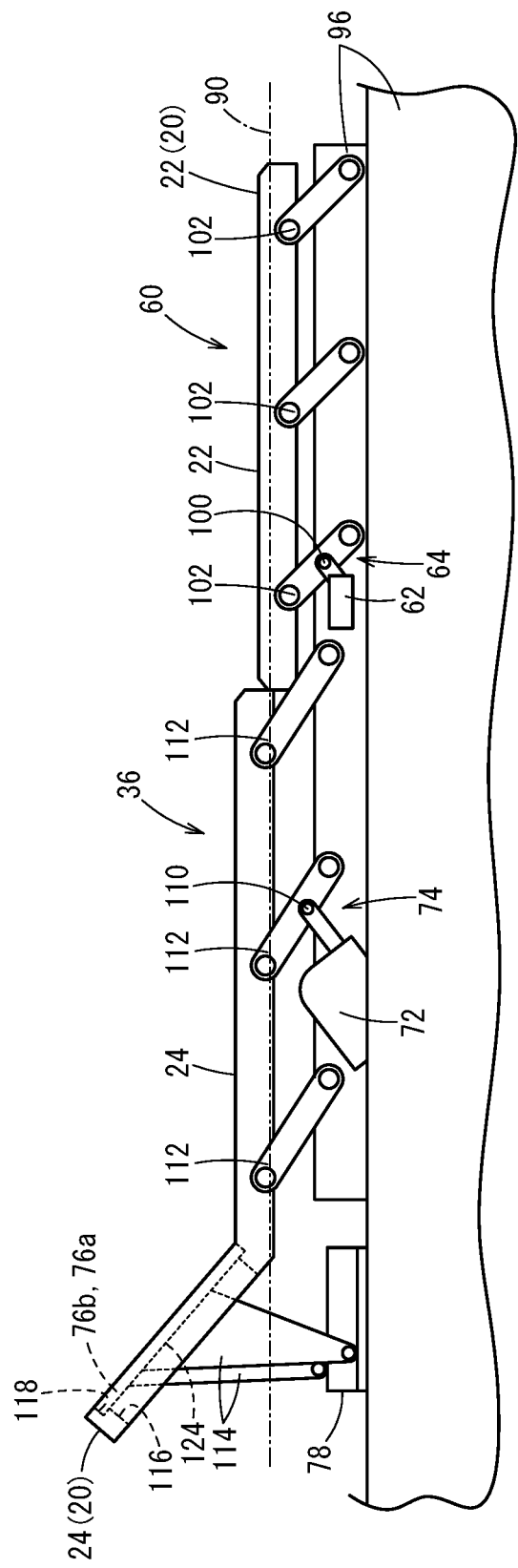
FIG. 4 shows workings of the rear panel lifting mechanism and the pedal adjustment mechanism during automated driving.

Referring to FIGS. 3 to 5B, the rear panel lifting mechanism 60 and the pedal adjustment mechanism 36 are described in detail. In FIGS. 3 and 4, the near side of the page represents the left side and the far side of the page represents the right side. FIGS. 3 and 4 show the rear motor 62 and the third power transmission mechanism 64 on the left side of the rear panel lifting mechanism 60.

The rear panel lifting mechanism 60 is constructed as follows. The rear motor 62 is fixed to a vehicle body 96. The right and left third power transmission mechanisms 64 each have a rear rod 100 and three rear plates 102. One end of the rear rod 100 is coupled with the rear motor 62 and the other end of the rear rod 100 is coupled at a substantially center of one of the rear plates 102. The other end of the rear rod 100 is rotatable about an axis parallel to the right-left direction with respect to the rear plate 102. One end of the rear plate 102 is coupled with the vehicle body 96 and the other end of the rear plate 102 is coupled with the rear panel 22. One end of the rear plate 102 is rotatable about an axis parallel to the right-left direction with respect to the vehicle body 96. The other end of the rear plate 102 is rotatable about an axis parallel to the right-left direction with respect to the rear panel 22. The three rear plates 102 are parallel to one another and are arranged such that their longitudinal direction runs obliquely from an upper front side toward a lower back side.

The pedal adjustment mechanism 36 is constructed as follows. The front motor 72 is fixed to the vehicle body 96. The right and left fourth power transmission mechanisms 74 each have a front rod 110 and three front plates 112. One end of the front rod 110 is coupled with the front motor 72 and the other end of the front rod 110 is coupled at a substantially center of one of the front plates 112. The other end of the front rod 110 is rotatable about an axis parallel to the right-left direction with respect to the front plate 112. One end of the front plate 112 is coupled with the vehicle body 96 and the other end of the front plate 112 is coupled with the front panel 24. One end of the front plate 112 is rotatable about an axis parallel to the right-left direction with respect to the vehicle body 96. The other end of the front plate 112 is rotatable about an axis parallel to the right-left direction with respect to the front panel 24. The three front plates 112 are arranged such that their longitudinal direction runs obliquely from an upper front side toward a lower back side.

The front panel 24 is coupled with the lower edge of the pedal 76, that is, the lower edges of the brake pedal 76b and the accelerator pedal 76a. The brake pedal 76b and the accelerator pedal 76a are rotatable about an axis parallel to the right-left direction with respect to the front panel 24. As the brake pedal 76b and the accelerator pedal 76a are essentially of the same structure, the structure of the brake pedal 76b, which is relatively located on the left, will be described below.

A back face 124 of the brake pedal 76b has a guide (not shown) extending in the longitudinal direction, and a pedal plate 114 capable of moving in the longitudinal direction along the guide is attached. The pedal plate 114 extends downward from the brake pedal 76b and passes through a hole 116 formed in the front panel 24 to be coupled with the pedal supporting portion 78 located below the front panel 24. The pedal plate 114 is rotatable about an axis parallel to the right-left direction with respect to the pedal supporting portion 78. The pedal supporting portion 78 is fixed to the vehicle body 96.

Figure 5A:
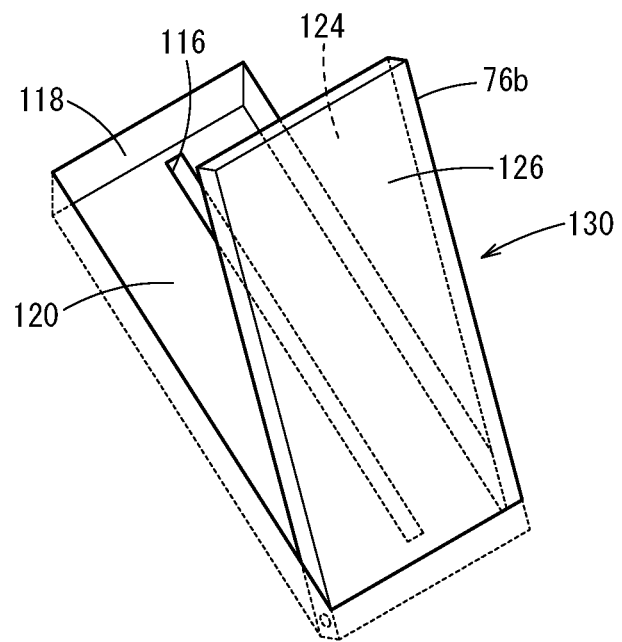
FIG. 5A schematically illustrates relative positions of a pedal and a front panel during manual driving, and FIG. 5B schematically illustrates relative positions of the pedal and the front panel during automated driving.
Figure 5B:
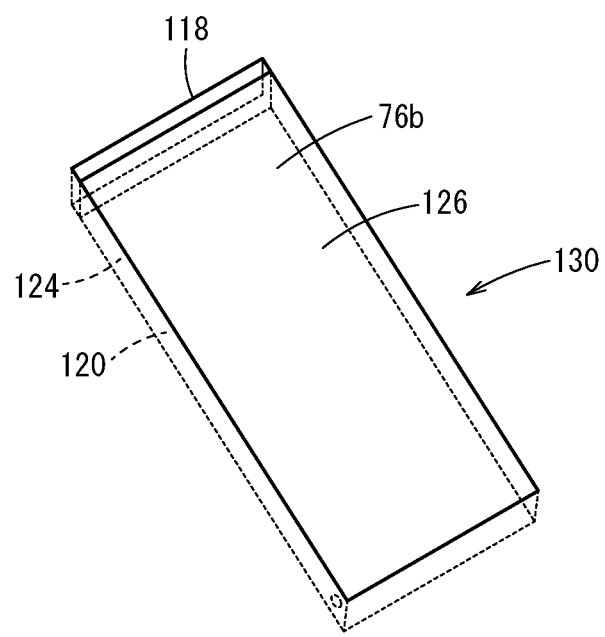

As shown in FIG. 5A, a recess 118 is formed at a location on the front panel 24 where the brake pedal 76b (and the accelerator pedal 76a) are arranged. When the brake pedal 76b is not tilted forward, the back face 124 of the brake pedal 76b and a bottom surface 120 of the recess 118 are separated from each other. The size of the recess 118 is slightly larger than the size of the brake pedal 76b. Accordingly, the recess 118 can accommodate the brake pedal 76b when the brake pedal 76b is tilted forward. As shown in FIG. 5B, when the brake pedal 76b is accommodated in the recess 118, the back face 124 of the brake pedal 76b and the bottom surface 120 of the recess 118 come into contact with each other. In this situation, a front face 130 of the floor panel 20 and a pressing surface 126 of the brake pedal 76b are flush with each other.

The rear panel lifting mechanism 60 operates as follows. As described above in [3.1.], the arithmetic unit 84 of the controller 80 rotates the rear motor 62 when switching the driving state of the vehicle from the manual driving state to the automated driving state. When the rear motor 62 rotates in one direction, the rear rod 100 translates obliquely backward and upward to push the rear plate 102. The rear plate 102 then rotates about the axis at its lower end to push up the rear panel 22. At this point, the other rear plates 102 also rotate about the axis at their lower ends, supporting the rear panel 22 so that it does not incline in the fore-and-aft direction. In switching from the automated driving state to the manual driving state, the components operate in the reverse direction.

The pedal adjustment mechanism 36 operates as follows. As described above in [3.1.], the arithmetic unit 84 of the controller 80 rotates the front motor 72 when switching the driving state of the vehicle from the manual driving state to the automated driving state. When the front motor 72 rotates in one direction, the front rod 110 translates obliquely backward and upward to push the front plate 112. The front plate 112 then rotates about the axis at its lower end to push up the front panel 24. At this point, the other front plates 112 also rotate about the axis at their lower ends, supporting the front panel 24 so that it does not incline in the fore-and-aft direction. In switching from the automated driving state to the manual driving state, the components operate in the reverse direction.

The brake pedal 76b has its back face 124 coupled with the pedal supporting portion 78 via the pedal plate 114 and its lower end coupled with the floor panel 20. Thus, when the front panel 24 rises, the brake pedal 76b is pulled by the pedal plate 114 to tilt forward. At this point, the pedal plate 114 moves toward the upper end of the brake pedal 76b. Consequently, as shown in FIGS. 4 and 5B, the brake pedal 76b is accommodated in the recess 118.

[5. Technical Ideas Provided by the Embodiment]

Technical ideas that can be derived from the embodiment above are presented below.

The first aspect of the present invention is an occupant posture adjustment device 30 which is installed on a vehicle capable of switching between a first driving state in which driving control is partially performed in response to an operation of a pedal 76 and a second driving state in which driving control is partially performed without relying on the operation of the pedal 76, the occupant posture adjustment device 30 including: a seat adjustment mechanism 34 that changes at least one of a position and an inclination of a seat 10 between the first driving state and the second driving state; a pedal adjustment mechanism 36 that changes an inclination of the pedal 76 with respect to a floor panel 20 between the first driving state and the second driving state; and a controller 80 that, in the first driving state, controls the seat adjustment mechanism 34 such that a posture of an occupant is set to a driving posture and controls the pedal adjustment mechanism 36 such that a back face 124 of the pedal 76 and the floor panel 20 are separated from each other, and in the second driving state, controls the seat adjustment mechanism 34 such that the posture of the occupant is set to a non-driving posture and controls the pedal adjustment mechanism 36 such that the back face 124 of the pedal 76 and the floor panel 20 come into contact with each other.

When the back face 124 of the pedal 76 and the floor panel 20 are in contact with each other in the second driving state as in the above configuration, there is no gap between the pedal 76 and the floor panel 20 so that the foot space in the driver's seat is simplified. Thus, the spatial efficiency and appearance of the foot space in the driver's seat are improved.

In the first aspect of the present invention, the floor panel 20 may include a recess 118 corresponding to a size of the pedal 76, and the controller 80 may control the pedal adjustment mechanism 36 in the second driving state such that the back face 124 of the pedal 76 and a bottom surface 120 of the recess 118 come into contact with each other.

When the pedal 76 is accommodated in the recess 118 as in the above configuration, the foot space in the driver's seat is further simplified. Thus, the spatial efficiency and appearance of the foot space in the driver's seat are improved.

In the first aspect of the present invention, when a driving state is switched from the first driving state to the second driving state or from the second driving state to the first driving state, the controller 80 may control the seat adjustment mechanism 34 and the pedal adjustment mechanism 36 such that a timing at which a motion of the seat 10 ends and a timing at which a motion of the floor panel 20 ends are synchronized.

By synchronizing the timing at which the motion of the seat 10 ends and a timing at which the motion of the floor panel 20 ends, the above configuration can make the occupant feel that both the switching of the driving state and the switching of the driving posture are done smoothly.

In the first aspect of the present invention, the controller 80 may control the seat adjustment mechanism 34 such that an eye point 94 is kept constant between the first driving state and the second driving state.

By keeping the eye point 94 constant, the above configuration can keep the occupant's sense of forward recognition constant even when the driving posture of the occupant is changed.

The second aspect of the present invention is a pedal device 32 which is installed on a vehicle capable of switching between a first driving state in which driving control is partially performed in response to an operation of a pedal 76 and a second driving state in which driving control is partially performed without relying on the operation of the pedal 76, the pedal device 32 including: a pedal adjustment mechanism 36 that changes an inclination of the pedal 76 with respect to a floor panel 20 between the first driving state and the second driving state; and a controller 80 that, in the first driving state, controls the pedal adjustment mechanism 36 such that a back face 124 of the pedal 76 and the floor panel 20 are separated from each other, and in the second driving state, controls the pedal adjustment mechanism 36 such that the back face 124 of the pedal 76 and the floor panel 20 come into contact with each other.

When the back face 124 of the pedal 76 and the floor panel 20 are in contact with each other in the second driving state as in the above configuration, there is no gap between the pedal 76 and the floor panel 20 so that the foot space in the driver's seat is simplified. Thus, the spatial efficiency and appearance of the foot space in the driver's seat are improved.

In the second aspect of the present invention, the floor panel 20 may include a recess 118 corresponding to a size of the pedal 76, and the controller 80 may control the pedal adjustment mechanism 36 in the second driving state such that the pedal 76 is accommodated in the recess 118.

When the pedal 76 is accommodated in the recess 118 as in the above configuration, the foot space in the driver's seat is further simplified. Thus, the spatial efficiency and appearance of the foot space in the driver's seat are improved.

In the second aspect of the present invention, in the second driving state, a pressing surface 126 of the pedal 76 and a front face 130 of the floor panel 20 may become flush with each other.

When the pressing surface 126 of the pedal 76 and the front face 130 of the floor panel 20 are flush as in the above configuration, the foot space in the driver's seat is simplified. Thus, the spatial efficiency and appearance of the foot space in the driver's seat are improved.

It will be appreciated that the occupant posture adjustment device and pedal device according to the present invention are not limited to the above embodiment but may employ various other configurations without departing from the scope of the invention.

What is claimed is:

1. An occupant posture adjustment device which is installed on a vehicle configured to switch between a manual driving state in which driving control is partially performed in response to an operation of a pedal and an automated driving state in which driving control is partially performed without relying on the operation of the pedal, the occupant posture adjustment device comprising:

a seat adjustment mechanism configured to change at least one of a position and an inclination of a seat between the manual driving state and the automated driving state;

a pedal adjustment mechanism configured to change a height position of a floor panel and an inclination angle of the pedal with respect to the floor panel, between the manual driving state and the automated driving state; and a controller configured to, in the manual driving state, control the seat adjustment mechanism to set a posture of an occupant to a driving posture and control the pedal adjustment mechanism to separate a back face of the pedal and the floor panel from each other, and in the automated driving state, control the seat adjustment mechanism to set the posture of the occupant to a non-driving posture and control the pedal adjustment mechanism to bring the back face of the pedal and the floor panel into contact with each other, wherein a lower edge of the pedal is coupled with the floor panel, wherein the controller is configured to raise the floor panel and the coupling between the lower edge of the pedal and the floor panel causes the pedal to tilt forward when the manual driving state is switched to the automated driving state.

2. The occupant posture adjustment device according to claim 1, wherein
the floor panel includes a recess corresponding to a size of the pedal, and
the controller controls the pedal adjustment mechanism in the automated driving state to bring the back face of the pedal and a bottom surface of the recess into contact with each other.

3. The occupant posture adjustment device according to claim 1, wherein, when a driving state is switched from the manual driving state to the automated driving state or from the automated driving state to the manual driving state, the controller controls the seat adjustment mechanism and the pedal adjustment mechanism to synchronize a timing at which a motion of the seat ends and a timing at which a motion of the floor panel ends.

4. The occupant posture adjustment device according to claim 1, wherein the controller controls the seat adjustment mechanism to keep an eye point constant between the manual driving state and the automated driving state.

5. The occupant posture adjustment device according to claim 1, further comprising:

a pedal supporting portion located below the floor panel; and a pedal plate extending downward from the back face of the pedal, passing through a hole formed in the floor panel, and coupled with the pedal supporting portion, the pedal is rotatable about an axis parallel to a right-left direction with respect to the floor panel, and the pedal plate is movable along a longitudinal direction of the pedal and rotatable about an axis parallel to a right-left direction with respect to the pedal supporting portion.

6. A pedal device which is installed on a vehicle configured to switch between a manual driving state in which driving control is partially performed in response to an operation of a pedal and an automated driving state in which driving control is partially performed without relying on the operation of the pedal, the pedal device comprising:

a pedal adjustment mechanism configured to change a height position of a floor panel and an inclination angle of the pedal with respect to a floor panel between the manual driving state and the automated driving state; and a controller configured to, in the manual driving state, control the pedal adjustment mechanism to separate a back face of the pedal and the floor panel from each other, and in the automated driving state, control the pedal adjustment mechanism to bring the back face of the pedal and the floor panel into contact with each other, wherein a lower edge of the pedal is coupled with the floor panel, wherein the controller is configured to raise the floor panel and the coupling between the lower edge of the pedal and the floor panel causes the pedal to tilt forward when the manual driving state is switched to the automated driving state.

7. The pedal device according to claim 6, wherein
the floor panel includes a recess corresponding to a size of the pedal, and
the controller controls the pedal adjustment mechanism in the automated driving state such that the pedal is accommodated in the recess.

8. The pedal device according to claim 7, wherein, in the automated driving state, a pressing surface of the pedal and a front face of the floor panel become flush with each other.

9. The pedal device according to claim 6, further comprising:

a pedal supporting portion located below the floor panel; and a pedal plate extending downward from the back face of the pedal, passing through a hole formed in the floor panel, and coupled with the pedal supporting portion, the pedal is rotatable about an axis parallel to a right-left direction with respect to the floor panel, and the pedal plate is movable along a longitudinal direction of the pedal and rotatable about an axis parallel to a right-left direction with respect to the pedal supporting portion.

* * * * *